April 10, 1934. S. T. WILLIAMS ET AL 1,954,162
TALKING MACHINE OR PHONOGRAPH MECHANISM
Filed Feb. 28, 1929 6 Sheets-Sheet 1

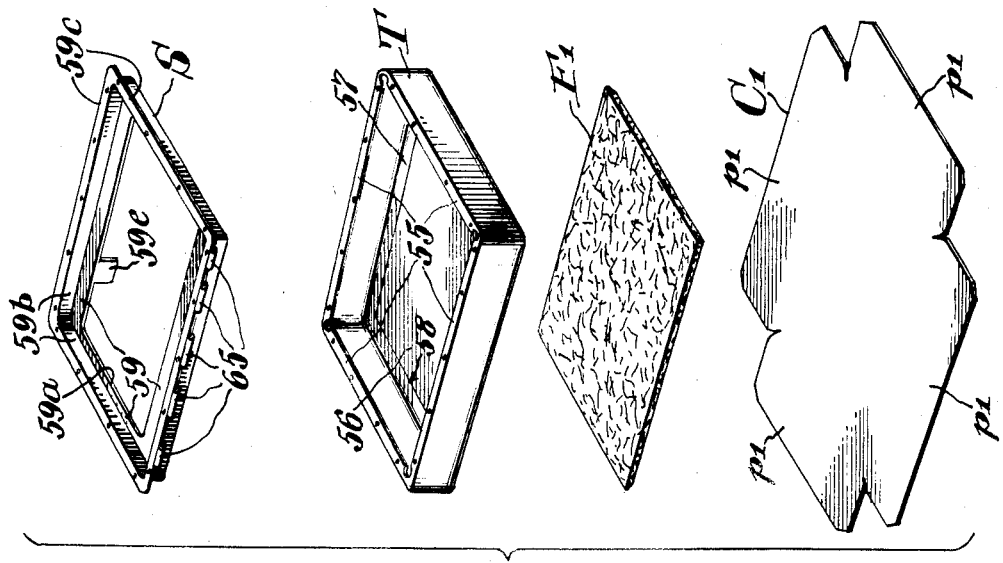
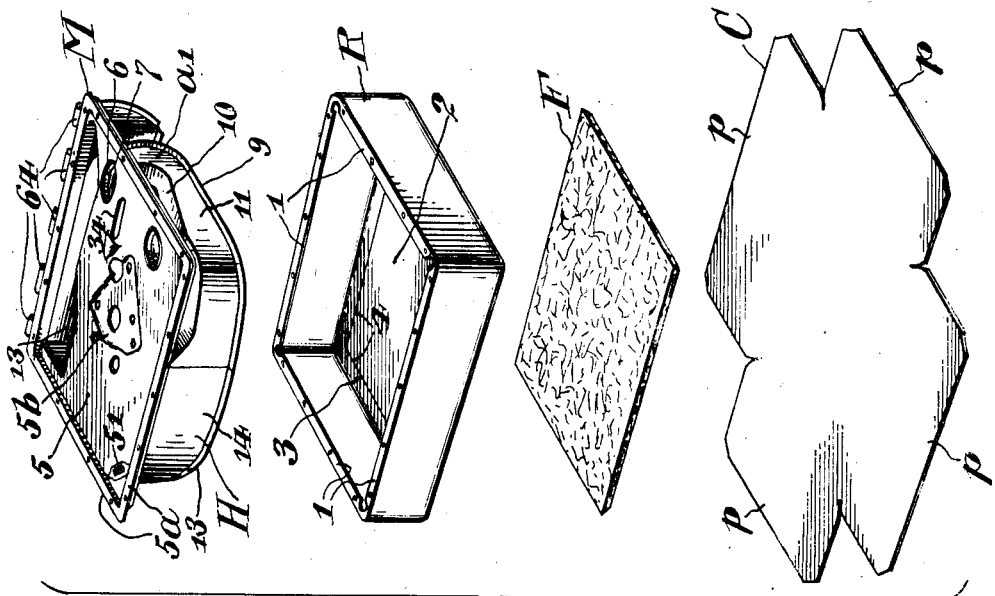

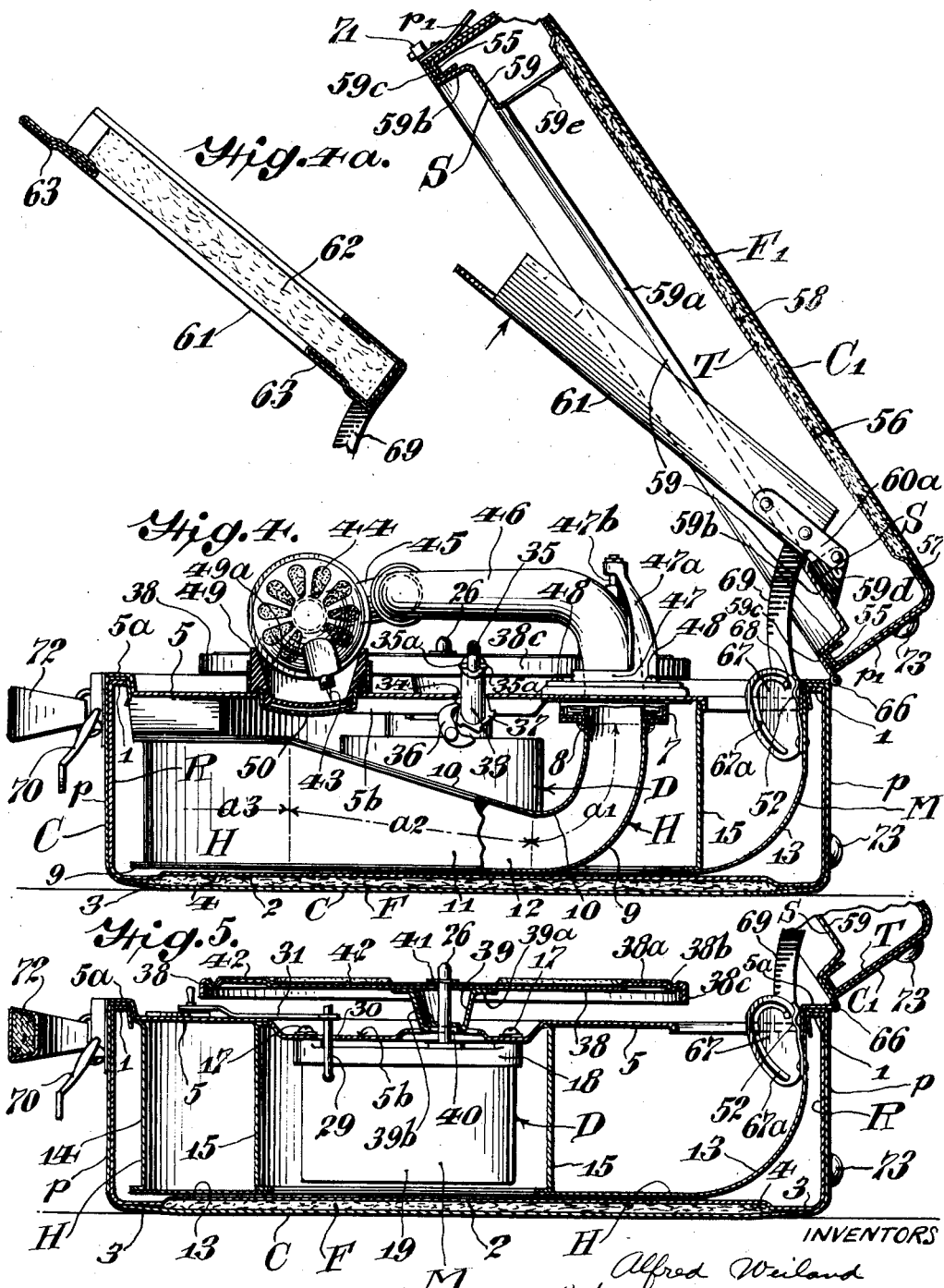

April 10, 1934.   S. T. WILLIAMS ET AL   1,954,162
TALKING MACHINE OR PHONOGRAPH MECHANISM
Filed Feb. 28, 1929   6 Sheets-Sheet 4
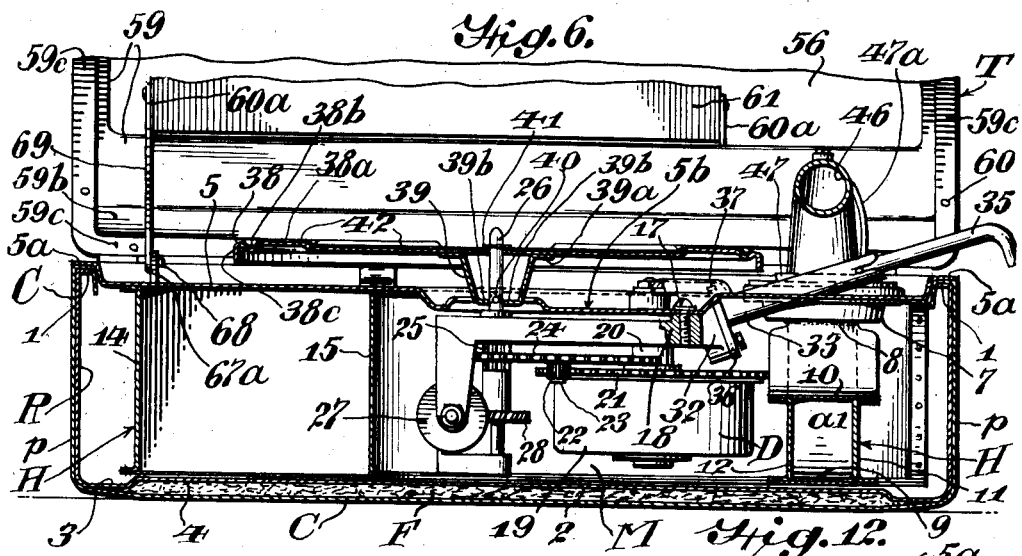
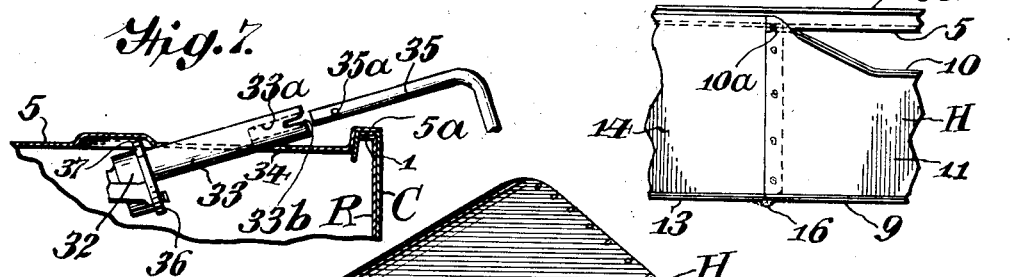
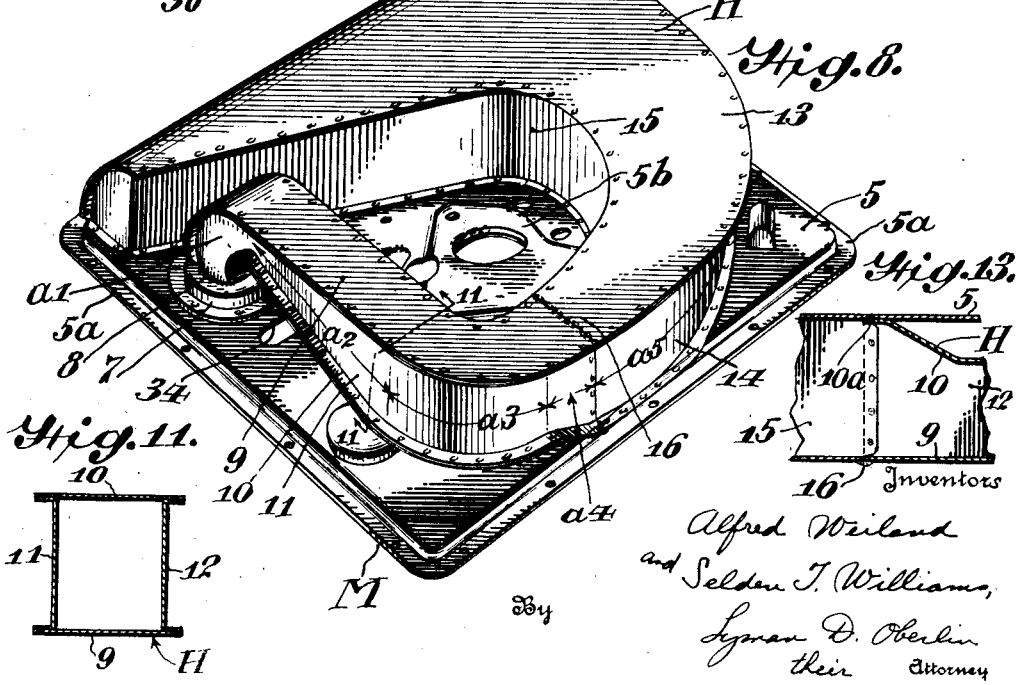
Inventors
Alfred Weiland
and Selden T. Williams
Lyman D. Oberlin
their Attorney

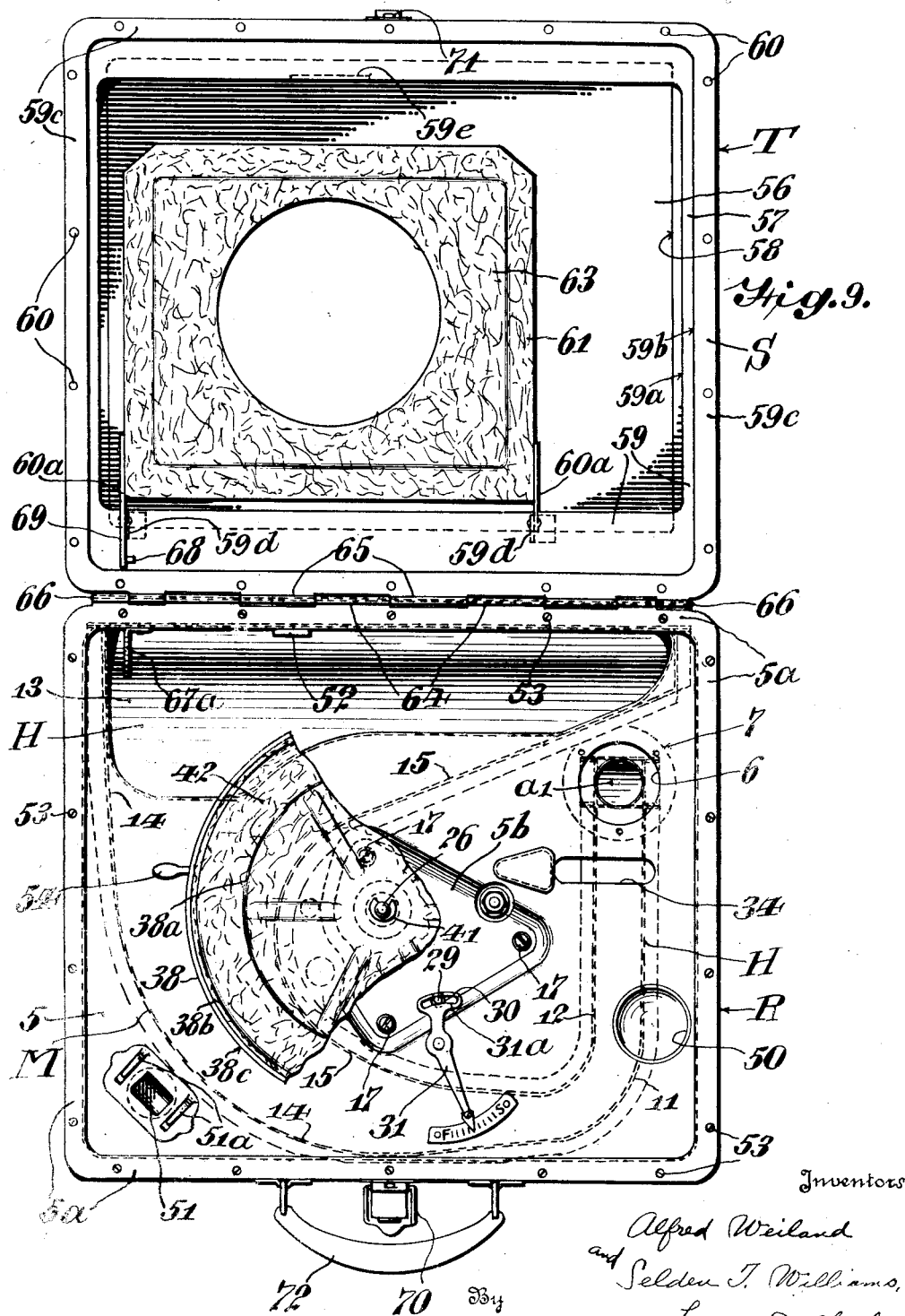

Patented Apr. 10, 1934

1,954,162

UNITED STATES PATENT OFFICE 1,954,162

TALKING MACHINE OR PHONOGRAPH MECHANISM

Selden T. Williams, Woodbury, and Alfred Weiland, Neshanic, N. J., assignors, by mesne assignments, to Radio Corporation of America, New York, N. Y., a corporation of Delaware Application February 28, 1929, Serial No. 343,438

12 Claims. (Cl. 274—2)

Our invention relates to talking machine or phonograph mechanism particularly such as is portable or which may readily be carried from place to place.

Our invention relates particularly to mechanism, as aforesaid, which comprises a base having a pivoted or hinged cover, the base being formed from a receptacle-like structure bridged or closed at or adjacent its top by a motor board beneath which is disposed suitable horn structure and a turntable-operating motive device.

In accordance with our invention, the aforesaid base comprises a receptacle or casing having a motor board, or other member, extending transversely and spaced from the bottom wall thereof, said receptacle or casing having disposed therein horn structure carried by said motor board or member in more or less intimate relation.

Further in accordance with our invention, the aforesaid motor board or member, on the same side thereof with said horn structure, carries a suitable motive device, said motor board or member, said horn structure and said motive device constituting, in effect, a unitary structure for association as such with a talking machine or phonograph casing or receptacle.

Further in accordance with our invention, a talking machine or phonograph motor board formed of metallic sheet material has more or less permanently secured thereto horn structure likewise formed of metallic sheet material; more particularly, a section of said horn structure, adjacent the throat thereof, is circumferentially complete and spaced from said motor board while another section of said horn structure, adjacent the mouth thereof, is secured to said motor board and forms therewith a circumferentially complete horn structure section.

Further in accordance with our invention, a receptacle or casing utilizable either as an enclosure for talking machine or phonograph mechanism or as a cover therefor is formed from metallic sheet material fashioned into a figure of predetermined configuration, the side wall structure of said casing or receptacle having secured thereto a member which retains the configuration thereof in its predetermined condition or relation.

Further in accordance with our invention, the aforesaid member, when said casing or receptacle is utilizable as an enclosure for talking machine or phonograph mechanism, constitutes a motor board extending transversely thereof and secured thereto at or adjacent the top thereof.

Further in accordance with our invention, the aforesaid member, when said casing or receptacle constitutes a cover, is a frame member comprising angularly related sections disposed within and secured to the side walls thereof.

Further in accordance with our invention, a talking machine or phonograph receptacle or casing has a fabric cover adhesively secured to exterior surfaces of its side walls, said cover being folded over the end surfaces of said side walls and terminating interiorly of said receptacle where it is held by a member secured to said side walls at or adjacent their extremities.

Further in accordance with our invention, the aforesaid member may be the talking machine or phonograph motor board and, if desired, may be formed of sheet-like metallic material for detachable engagement, or otherwise, with the side walls of the aforesaid casing or receptacle which, usually, but by no means necessarily, may also be formed of sheet-like metallic material.

Further in accordance with our invention, the aforesaid casing or receptacle may constitute the cover for talking machine or phonograph mechanism and said member may be a reinforcing frame disposed interiorly thereof at or adjacent the extremities of the casing or receptacle side walls.

Our invention resides in the mechanism, article, features and details of construction of the character hereinafter described and claimed.

For an understanding of our invention and for an illustration of one of the forms our article or mechanism may take, reference is to be had to the accompanying drawings in which:

Fig. 2 is a view in perspective illustrating parts of a talking machine or phonograph base, said parts being shown in disassembled relation.

Fig. 3 is a view in perspective illustrating parts of a talking machine or phonograph cover, said parts being shown in disassembled relation.

Fig. 4 is a vertical sectional view, partly in elevation, taken on the line 4—4 of Fig. 1 and looking in the direction of the arrows.

Fig. 4a is a vertical sectional view, partly in elevation, of a receptacle for talking machine or phonograph records.

Fig. 5 is a vertical sectional view, partly in elevation, taken on the line 5—5 of Fig. 1 and looking in the direction of the arrows.

Fig. 6 is a transverse vertical sectional view, partly in elevation, taken on the line 6—6 of Fig. 1 and looking in the direction of the arrows.

Fig. 7 is a fragmentary vertical sectional view, partly in elevation, of winding mechanism for a spring motive device, the operating crank being shown as disassembled from the shaft operated thereby.

Fig. 8 is a perspective view of a talking machine or phonograph motor board and associated horn structure, the position of said motor board and said horn structure being shown as substantially inverted with respect to the normal position thereof.

Fig. 9 is a plan view, with parts omitted, of talking machine or phonograph mechanism having its cover disposed in fully open position.

Fig. 11 is a transverse vertical sectional view taken on the line 11—11 of Fig. 8 and looking in the direction of the arrows.

Fig. 12 is a side elevational view of a part of the structure shown in Fig. 8.

Fig. 13 is a longitudinal sectional view of the structure shown in Fig. 12.

Figure 1:
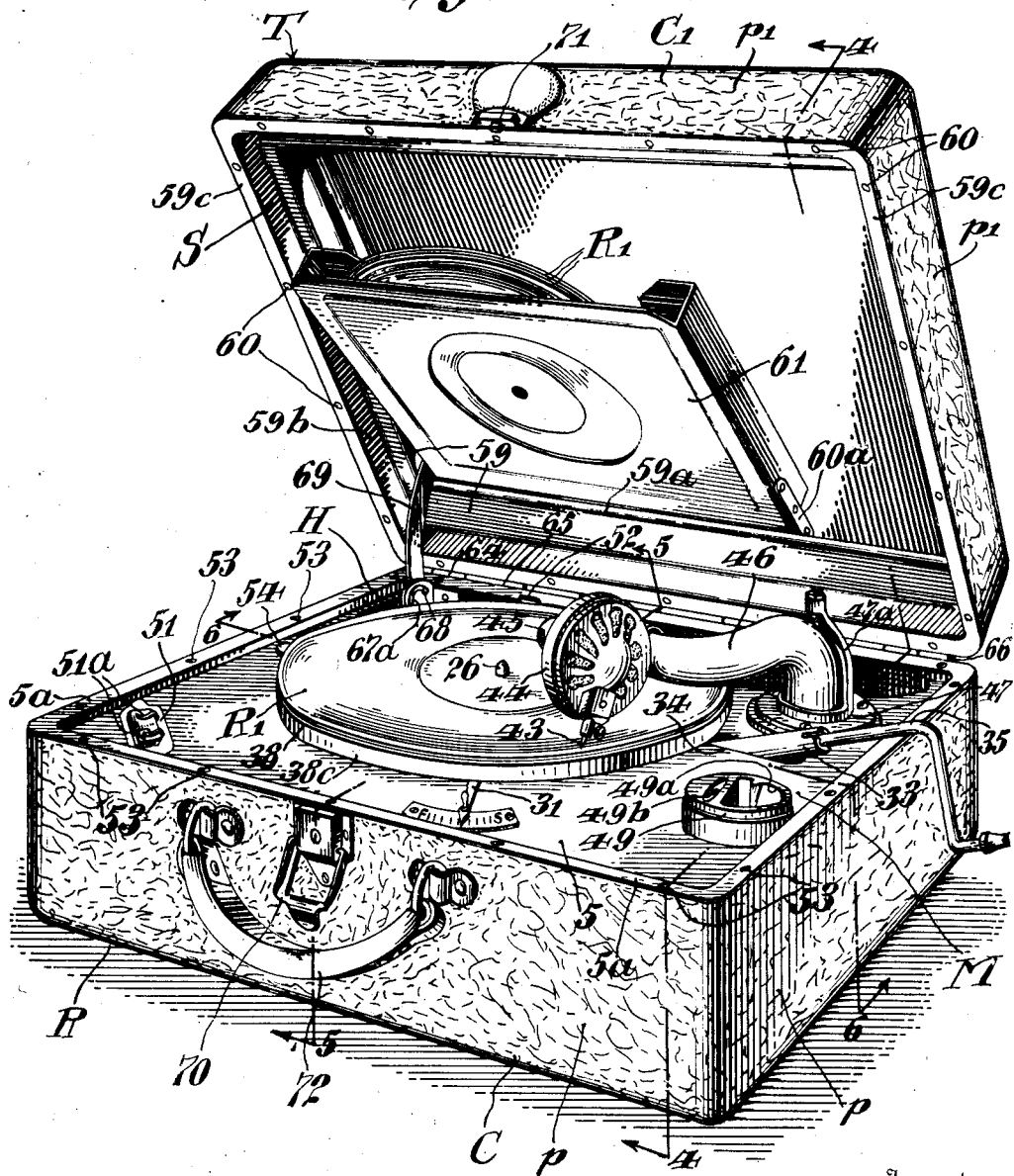
Figure 1 is a perspective view of talking machine or phonograph mechanism constructed in accordance with our invention with the cover in normal or sound reproducing position.

Referring to the drawings, there is illustrated a portable talking machine or phonograph formed from a base having a cover hinged or pivoted thereto. As hereinafter more fully described, the aforesaid base comprises a receptacle or casing receiving a suitable motive device for operating a turntable; the latter overlies a motor board extending transversely of said receptacle and positioned, preferably, at or closely adjacent the top thereof. The aforesaid motive device depends from and is carried by said motor board as does suitable horn structure traversed by sound waves passing thereto from an oscillatory tone arm or taper tube carrying a sound box, the stylus of which coacts with a talking machine or phonograph record disposed on the aforesaid turntable. In the example shown, the aforesaid hinged cover is receptacle-like in character and is reinforced by a skeleton-like frame to which is pivoted a carrier or compartment for talking machine or phonograph records.

Preferably and ordinarily, the aforesaid receptacles, to wit, the base receptacle and the cover receptacle, are formed from sheet-like metallic material, exterior surfaces of which are covered by suitable material, as some fabric of an ornamental and pleasing appearance, such, for example, as that known to the trade as "fabrikoid". Any suitable fabric may thus be utilized; in general, they comprise a suitable cloth coated or covered with rubber, a celluloid or pyralin compound, or the like. Usually, a layer of felt-like material is confined against the exterior surface of the base bottom wall by the aforesaid cover and, similarly, another layer of felt-like material is confined against the exterior surface of the cover top. Due to the presence of this felt-like material, the appearance of the completed article is improved, as are other characteristics thereof.

More specifically, and as illustrated particularly in Fig. 2, the aforesaid base comprises a receptacle R substantially rectangular in configuration and formed, preferably, by a stamping operation from a single piece of sheet-like metallic material, such as iron or steel. The side walls of the receptacle R terminate, in the example shown, in inwardly directed flanges 1 and, as well illustrated in Figs. 4, 5, 6 and 10, the bottom wall 2 of said receptacle R is shaped, preferably, so as to produce a peripheral rim 3 bounding a shallow depression 4 for the reception of the layer F, Fig. 2, of felt-like material which is disposed in the position illustrated in Figs. 4, 5, 6 and 10 and there held by the cover C. The depression 4 affords adequate space for the layer F and the inclined wall between rim 3 and depression 4 strengthens the bottom wall 2. The panels $p$ of cover C are adhesively secured to the exterior surfaces of the side walls of receptacle R, the extremities of said panels being folded over the aforesaid flanges 1 and terminating interiorly of the receptacle R. Any suitable adhesive or cement may thus be utilized such, for example, as known to the automotive art for securing a fabric to a metal surface; it should be free from sulphur and should be applied to the cover and side walls and allowed to dry for a few minutes before application of the cover to said side walls.

In the example shown, the upper open side of the receptacle R is closed by a transverse member 5 of an assembly M, the member 5 forming the motor board of the talking machine or phonograph. As well illustrated, the member 5 has disposed, at one side thereof, a motive device D and an amplifying horn H. These parts constitute an assembly and they are more or less permanently secured to each other. A prominent feature of our invention involves the provision of such an assembly together with an arrangement for associating it, usually detachably, with the receptacle R.

The member 5, in the example shown, is formed of sheet-like metallic material, such as iron or steel. A rim or flange $5a$, in the example illustrated, displaced from the plane of the main section of said member 5 bounds or borders the latter and it is this rim $5a$ that rests upon the flanges 1 of receptacle R.

Adjacent one corner thereof, the member 5 is provided with a perforation 6, Fig. 9, and to the lower side of said member 5, Fig. 9, there is secured a bushing or adapter 7 having a passage of smaller cross-sectional configuration than that of the perforation 6 but registering therewith. Received in said passage of smaller cross-sectional configuration is the throat of the horn structure H, adjacent surfaces of the latter and the bushing 7 being soldered or otherwise suitably secured together as indicated at 8, Fig. 4. At the region where union is thus effected, the throat of the horn structure H is substantially circular but immediately adjacent thereto, it is rectangular in cross-section. Accordingly, the throat portion proper of the horn structure H constitutes a curved section $a1$, Fig. 4, dimensionally and cross-sectionally substantially the same in different transverse regions thereof.

As illustrated in Fig. 4, the horn structure H throughout a length indicated at $a2$ extends directly toward the opposite corner of the member 5 on the same side thereof, but said horn structure diverges in a vertical sense in that the top wall thereof is inclined. Throughout a length indicated at $a3$, Fig. 8, the horn structure H curves toward that corner of the member 5 diagonally opposite the corner at which the throat of said horn structure H is located. Throughout the length last mentioned, said horn structure has substantially the same dimensions and cross-sectional configurations in different transverse regions. Throughout a length indicated at $a4$, Fig. 8, the horn structure H is again diverging in a vertical sense because the top wall thereof is inclined, Fig. 4, said top wall, eventually, contacting with the member 5.

Throughout the lengths a1, a2, a3 and a4, the width of the horn structure, as the latter is illustrated in Figs. 4 and 11, remains substantially constant whereas the depth thereof progressively increases. The bottom wall 9, the top wall 10, and the side walls 11 and 12 of the aforesaid horn structure lengths a1, a2, a3 and a4 are each formed from single members of sheet-like metallic material properly curved or bent and joined together in any suitable manner, as by solder, rivets, or the like. However, particularly from a manufacturing standpoint, it is advantageous to construct the section of the horn structure H constructed from the above noted lengths somewhat as illustrated in Fig. 11 where the bottom and top walls 9 and 10 are straight in the direction of their widths. The side walls 11 and 12 are substantially U- or channel-shaped and are fitted between the aforesaid top and bottom walls. Then, preferably, by a spot welding operation as indicated, the various walls are secured together to form a substantially closed channel through which the sound waves pass.

As stated above, the top wall 10 of the above described horn structure engages the motor board 5. This arrangement is illustrated particularly in Figs. 12 and 13 where one end 10a of said top wall 10 is shown as engaging the bottom surface of the motor board 5, adjacent surfaces of said top wall and motor board being spot welded, or otherwise suitably secured together.

In accordance with our invention, a part of the motor board 5 forms the top wall of the other section of the horn structure H defined by the length a5, the height of the latter section being substantially constant while the width flares or diverges.

As illustrated particularly in Figs. 5, 8, 12 and 13 and as stated above, the motor board 5 thus forms the top wall of said remaining section of the horn structure H, the bottom wall thereof being a member 13 of metallic sheet material. Disposed between the motor board 5 and the bottom wall 13 are the side walls 14 and 15 likewise of metallic sheet material; preferably, they are U- or channel-shaped, as are the side walls 11 and 12, and spot welded, or otherwise suitably secured, to adjacent surfaces of said motor board 5 and said bottom wall 13. As well shown in Figs. 8, 12 and 13, the side walls 11 and 12 of one horn section may be fitted within the side walls 14 and 15 of the other horn section, adjacent surfaces of all of said side walls being suitably secured together, as by spot welding. Preferably, the two horn bottom walls 9 and 13 are brought into substantial abutting relation and united by a layer of solder 16, or said bottom walls may be welded or brazed together.

The horn side walls 14 and 15 flare or diverge beneath the motor board 5 as well illustrated in Figs. 8 and 9, the configuration of the bottom wall 13 being such that it forms with the side walls 14 and 15 a flaring sound wave passage closed on three sides by said walls. The bottom wall 13, therefore, rather abruptly increases in width and, in its widest portion, is curved or bent toward the motor board and into engagement with the vertical wall depending from the flange 5a thereof, adjacent surfaces of said bottom wall 13 and said vertical wall being suitably secured together, as by a spot welding operation. A part of the motor board 5 overlies a part of the aforesaid flaring sound wave passage but said motor board 5 is cut away or apertured as shown in Figs. 1, 4, 5, 6, 9 and 10 to form a passage permitting the sound waves to emerge from the horn structure after being deflected by the aforesaid bent or curved portion of the bottom wall 13.

The two horn structure sections just described are securely fastened to each other and to the motor board 5. The unit thus formed is compact, durable and well adapted for association with a base such as the receptacle R.

It shall be understood that our invention is not to be limited to a horn structure formed from a plurality of sections, to such a structure formed from walls of the precise shape herein illustrated, or to the utilization of the talking machine or phonograph motor board as a part of the horn wall structure. Such features, particularly the latter, are valuable, but, obviously, the horn structure may be formed from a single section and the walls thereof may be secured together other than by a spot welding operation. Moreover, if desired, the flanges formed by the channel-shaped side walls may be omitted in which case, adjacent surfaces of the horn walls may suitably be united.

As well illustrated in Fig. 8, the horn structure H is so shaped as to define a substantially annular space approximately centrally of the motor board 5. In this space and from said motor board 5, the aforesaid motive device D is suspended, Figs. 4, 5 and 6. This may be accomplished in any suitable manner. In the example shown, a plurality of screws 17 are utilized, said screws passing through the motor board 5 and being threaded into the frame 18 of said motive device D.

Since the motor board 5, preferably, is of relatively thin and lightweight sheet material, it is desirable that some type of reinforcement be provided in the region thereof bearing the weight of the motive device D. To this end, during the stamping operation that produces the motor board 5, it may be provided with a depressed central section 5b shaped, preferably, substantially as a triangle, the aforesaid screws 17 passing therethrough at the respective apices of said triangle. Due to the inclined walls thus formed, the depressed section 5b and the entire motor board is more resistant to deformation than would be the case were the motive device D suspended from an undepressed part of the motor board 5.

In the example illustrated, the motive device D is of the spring motor type and, particularly as illustrated in Figs. 4, 5 and 6, comprises or embodies a housing or drum 19 containing suitable coiled spring structure, not shown, by which is rotated a shaft 20 suitably journaled in the frame 18. Rotatable with the drum 19 is a gear 21 meshing with the pinion 22 rotatable with a shaft 23 also journaled in the aforesaid frame 18. Rotatable with the pinion 22 and the shaft 23 is a gear 24 meshing with and driving a pinion 25 keyed or otherwise securely fixed to a shaft or spindle 26 upon which the talking machine or phonograph turntable is disposed.

As well understood in the art, the rotative speed of the shaft 26 may be controlled by suitable governor mechanism embodying a disk 27 rotatable with and slidable longitudinally of a shaft, not shown, having a gear, not shown, rotatable therewith and meshing with a gear 28 rotatable with the aforesaid pinion 25 and shaft 26. As is usual, the position of the disk 27 longitudinally of its shaft determines the rotative speed of the turntable shaft 26, the position of said disk 27 being determined by suitable mechanism, not shown, but controlled by a member or rod 29 extending substantially vertically, Fig. 5, through a hole or perforation 30 in the depressed section 5b of the motor board. Pivoted to the motor board 5 and disposed above its upper surface is a lever 31 having, at one end, a manual actuating knob or member and, at its other end, an arcuate slot 31a through which the aforesaid member 29 extends. The lever 31 may be moved in one direction or another to oscillate the member 29 from right to left, Fig. 5, or vice versa, as the case may be, to either increase or decrease the rotative speed of the turntable shaft 26. It often happens that the motive device D is manually energized by manipulation of a crank, as hereinafter described, during a period of sound reproduction. This may cause the motor board 5 to flex somewhat but due to the arrangement just described, there is no effect on the speed of said motive device and, consequently, on the rotative speed of the turntable which it rotates.

In the example shown, there is journaled in a bearing 32, Fig. 6, of the motor frame 18 a shaft 33 suitably geared to a shaft, not shown, for winding the motor spring or springs and rotatable within the shaft 20. As illustrated, the shaft 33 extends through an elongated slot 34 in the motor board 5, Fig. 9, above which said shaft 33 is connected, in any suitable manner, to a crank arm 35. As illustrated particularly in Figs. 1, 6 and 7, the end of the shaft 33 above the motor board 5 comprises an open ended passage 33a in which one end of the aforesaid crank 35 is received, the latter comprising oppositely extending pins 35a received, respectively, in transversely aligned slots 33b at the end of shaft 33. By virtue of this construction, the proper end of the crank arm 35 may be readily inserted in the open end of shaft 33, the pins 35a passing within the respective slots 33b. Thereupon, when crank arm 35 is rotated, the pins 35a exercise a clutching effect on the shaft 33 to thereby rotate the latter. Obviously, the crank arm 35 may be disassociated from the shaft 33 in an equally simple manner. Suitable pawl and ratchet mechanism 36 and 37, or equivalent, may be utilized to prevent rotation of the shaft 33 in the direction permitting unwinding of the motor spring or springs.

Accordingly, in accordance with our invention, the same motor board that has the talking machine or phonograph horn structure more or less permanently secured thereto also carries, and on the same side thereof, the motor by which the turntable shaft is rotated. These essential parts, to wit, the motor board, horn structure and motor constitute an assembly of units which, in effect, are integral with each other particularly in the sense that, as a single unit, they may be readily associated with or removed from the receptacle R forming the base or supporting structure for the herein described apparatus.

The turntable may be of any suitable character. In the example shown, said turntable is a single piece of sheet metal material 38 brought to the desired configuration by a stamping operation. It is circular and provided with a central perforation for the reception of the shaft or spindle 26. From the turntable center there extends a plurality of spaced radial ribs beyond which there is a circular raised section 38a bounded by a circular groove 38b from which a circular flange 38c depends.

Suitably secured, as by a spot welding operation, to the lower surface of the turntable 38 is the circular flange 39a of a cup-like bearing member 39, the lower wall 39b of which is perforated for the reception of the shaft 26, said lower wall 39b comprising, on its lower surface, an elongated depression in which is received a pin 40 extending transversely through the shaft 26. For securing the turntable 38 and its bearing member 39 to the shaft 26, there may be utilized a clip 41 detachably received in a peripheral slot formed in the shaft 26 a suitable distance above the transverse pin 40. Ordinarily and preferably, suitable covering material is applied to the upper surface of the turntable 38. This may be a layer 42 of fabric, felt, or the like, cemented or otherwise suitably secured to the upper surface of said turntable 38. When the turntable is shaped as described, the aforesaid layer of material need be secured thereto only in the regions defined by the raised sections 38a and groove 38b.

The above described turntable may be of any suitable diameter, such as, ten inches, more or less. Individual talking machine or phonograph records R1 disposed thereon, usually manually, are adapted for coaction with the stylus or needle 43 of a sound box 44, or equivalent, supported for oscillatory movement in any suitable manner. In the example shown, the sound box 44 is detachably carried by a goose neck 45 pivoted to one end of a tone arm or taper tube 46, the other end of which is mounted for oscillatory movement in an apertured bearing member 47 suitably secured, as by screws 48, to the upper surface of the motor board 5, with the aperture of said bearing member 47 in registering relation with the passage through the bushing 7. Where the sound box supporting structure utilizes a goose neck as hereinbefore described, it is desirable that the bearing member 47 comprise a bracket or arm 47a having a pin 47b coacting with the tone arm or taper tube 46 to limit movement of the latter to a plane extending substantially parallel with the motor board 5.

As well understood, coaction of the stylus 43 with a talking machine or phonograph record actuates the sound box diaphragm to produce sound waves which pass through the goose neck 45 and the tone arm or taper tube 46; from the latter, said sound waves are discharged into the horn structure H from which they pass to the audience or listener by way of the large opening in the motor board 5.

When not coacting with a record on the turntable 38, the sound box 44 and its stylus 43 may be supported in any suitable manner. In the example shown and as more particularly described in the copending Weiland application, Serial No. 341,590, filed February 21, 1929, now Patent No. 1,843,529, dated February 2, 1932, there may thus be utilized a structure 49 detachably disposed in a depressed portion 50 of the motor board 5. The structure 49 may be formed of rubber of medium hardness and comprises a first compartment 49a for the reception of a part of the sound box 44 and a second compartment 49b for the reception of used or worn needles.

At one corner of the motor board 5 it may be apertured for the reception of a member 51 forming a receptacle receiving new and unused needles, if desired. The member 51 may also constitute a plurality of resilient members or fingers 51a utilizable, if desired, for detachably retaining therebeneath a package containing needles to be subsequently associated with the sound box 44.

To the member 13 forming the bottom wall of the horn structure H there may be riveted or otherwise suitably secured a clip or resilient member 52, Figs. 1, 4 and 5, between which and the adjacent surface of said member 13, the crank arm 35 may be temporarily secured when it is detached from the shaft 35.

After the cover C has been secured to the receptacle R by adhesive engagement of its panels p with the respective receptacle side walls and after the ends or extremities of said panels have been folded over the receptacle flanges 1 and interiorly of the receptacle, the motor board 5 is positioned transversely of said receptacle with its flange 5a supported by the receptacle flanges 1 but with the folded portions of the panels p disposed therebetween. The two adjacent members, to wit, the flanges 1 and 5a may be secured together in any suitable manner and when thus secured, the cover C is firmly and securely held in its proper and desired casing-covering position. In the example illustrated, for thus holding the aforesaid adjacent members together, screws 53 are passed through the flange 5a at spaced intervals and threaded into the flange 1.

The motor board 5, when positioned transversely of the receptacle R as described above, has depending therefrom and secured thereto the horn structure H and motive device D. By utilizing screws, or equivalent, for holding said motor board 5 in position, the motor board 5 may be detached at will should it become necessary, for example, to repair or oil said motive device D or associated parts. Ordinarily but not necessarily, and as illustrated particularly in Fig. 10, the lowermost wall of the horn structure H is slightly spaced from the bottom wall of the receptacle R. Even so, the horn side walls, angularly related as they are to the motor board 5, stiffen and otherwise strengthen the latter.

After the motor board and the thereby-carried parts have been associated with the receptacle R as described above, the turntable 38, taper tube 46, and other parts may be placed in their proper positions.

Any suitable form of brake mechanism may be utilized for discontinuing rotation of the turntable 38. In the example illustrated, such brake mechanism is manually operated by a lever 54, Fig. 1. However, it shall be understood that any desired type of automatic brake mechanism may be substituted for aforesaid manually operable mechanism.

When the receptacle R is formed of metallic sheet material as described above, a particularly valuable feature of our invention resides in the provision of a motor board which is securely fastened thereto. By virtue of such a construction, the receptacle side walls are securely braced and caused to retain the desired configuration which is usually rectangular. It shall be understood, however, that our invention is not to be limited to a receptacle formed of metallic material.

Although the herein-described arrangement comprising the flanges 1 and 5a is an effective and desirable way of securing the parts in assembled relation, and for holding the panels of cover C in proper position, it shall be understood that our invention contemplates any generally equivalent arrangement for accomplishing this purpose. Thus, any way in which a motor board, metallic or otherwise, or a member carried thereby, coacts with the vertical receptacle walls, metallic or otherwise, or a member carried thereby, to retain the receptacle cover in position shall be understood as coming within the purview of some phases of our invention.

As hereinbefore stated the cover to be associated with the above described base is receptacle-like in character and, as illustrated particularly in Fig. 3, comprises a receptacle T conforming in configuration with that of the receptacle R although ordinarily somewhat less in depth. The receptacle T is formed, preferably, by a stamping operation from a single piece of sheet-like metallic material, such as iron or steel, the side walls thereof terminating, in the example shown, in inwardly directed flanges 55. As well illustrated in Figs. 4 and 10, the top wall 56 of said receptacle T is shaped, preferably, so as to produce a peripheral rim 57 bounding a shallow depression 58 affording adequate space for the reception of the layer F1 of felt-like material, Fig. 2, which is disposed in the position illustrated in Figs. 4 and 10 and there held by the cover C1, the inclined wall between rim 57 and depression 58 strengthening the wall 56. As was the case with the cover C, panels p1 of cover C1 are adhesively secured or cemented, as aforesaid, to the exterior surfaces of the side walls of receptacle T, the extremities of said panels p1 being folded over the flanges 55 and terminating interiorly of the receptacle T.

Figure 10:
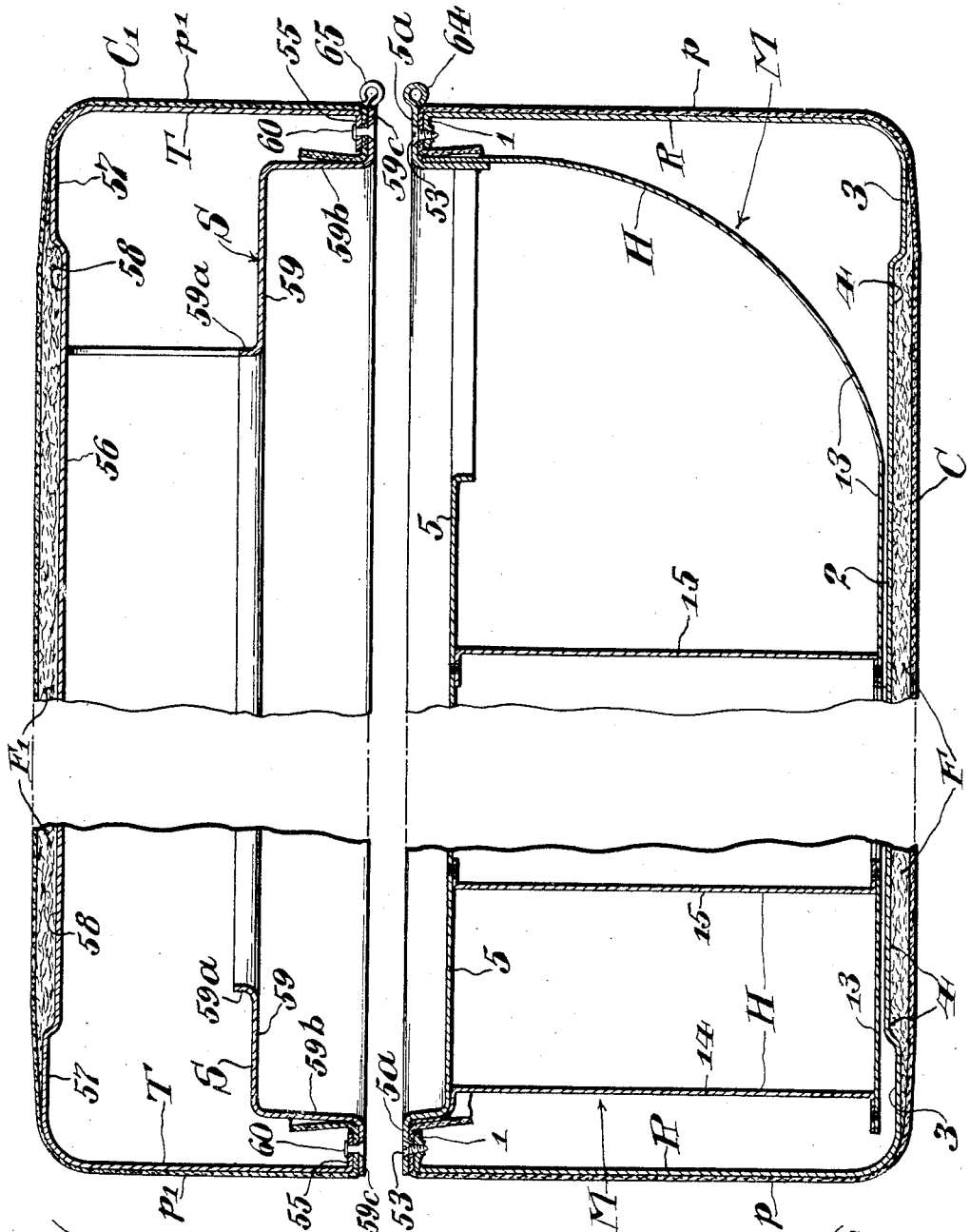
Fig. 10 is a vertical sectional view, partly in elevation and with parts omitted, of a talking machine or phonograph base and its associated cover.

In the example illustrated, the open side of the receptacle T receives a frame member S, Fig. 3, formed preferably by a stamping operation, from a single sheet of metallic material. As shown in Figs. 2 and 10, the frame S comprises a rectangular, horizontal ledge or rim 59 terminating, at one side, in a strengthening flange 59a and, at its other side, merging into a vertical wall 59b from which projects a flange 59c.

After the cover C1 has been secured to the receptacle T by adhesive engagement of its panels p1 with the respective receptacle side walls and after the ends or extremities of said panels have been folded over the receptacle flanges 55 interiorly of the receptacle T, the frame S is positioned transversely of said receptacle with its flange 59c spaced from the flanges 55 only by the adjacent portions of the panels p1. These two adjacent members, to wit, the flanges 55 and 59c may be secured together in any suitable manner and when thus secured, the cover C1 is firmly and securely held in its proper position and the receptacle T is caused to retain its desired configuration. Screws may be provided for holding the aforesaid flanges together but, preferably, spaced rivets 60 are utilized.

When the wall structure of the aforesaid receptacle T is formed from metallic sheet material as described, it is desirable that the strengthening frame S be associated therewith. Under such circumstances, the described arrangement for holding the cover C1 in place is especially satisfactory. It shall be understood, however, that generally equivalent arrangements may be utilized for holding said cover C1 in position by the frame S. Moreover, should said frame S not be provided, it shall be understood that our invention contemplates the provision of a member or structure between which and the wall structure of the casing C1 the aforesaid panel extremities are secured or gripped.

As illustrated in Figs. 4, 6 and 9, there projects or extends to one side of the ledge 59 a plurality of spaced members 59d to each of which is pivoted a member 60a. The members 60a are suitably secured to a receptacle 61 which constitutes a carrier for a plurality of talking machine or phonograph records R1. As illustrated, the receptacle 61 is substantially rectangular; open at one end, Fig. 1; centrally apertured on the side nearest the turntable 38, Fig. 9; and cut away on the side most removed from said turntable, Fig. 4a. Preferably, said receptacle 61 is formed from a single sheet of metallic material suitably folded or bent into the configuration illustrated. If desired, inner surfaces thereof may be padded as indicated at 62, Fig. 4a, and further, if desired, the exterior surfaces thereof may have adhesively secured thereto a layer of fabric 63 ends of which are folded interiorly of the receptacle walls and there adhesively secured.

The aforesaid receptacle T forms the cover for the receptacle R and these two structures may be pivoted or hinged together in any suitable manner. In the example shown, one section of the flange 5a of motor board 5 comprises spaced hinge ears 64 mating with similar hinge ears 65 comprised in one section of the flange 59c of member 59. After the openings in the aforesaid hinge ears have been brought into registering relation, a rod 66 is passed through all of them and is frictionally held therein to constitute the pivotal axis of the receptacle T which now, in inverted relation forms the talking machine or phonograph cover.

Preferably, and as more particularly described in the copending Hollerith application, Serial No. 303,418, filed September 1, 1928, now Patent No. 1,811,628, dated June 23, 1931, the aforesaid cover is maintained in elevated position, Figs. 1 and 4, by a member 67 secured, in the example shown, to the horn wall 13 and to the downwardly turned wall of the motor board 5, said member 67 comprising a cam slot 67a in which travels a pin 68 carried by a member 69 integral with the member 60a and secured to and movable with the receptacle 61. The mechanism just described, not only holds the aforesaid cover in elevated position, but functions, when slight pressure is applied to the receptacle 61 in the direction of the arrow, Fig. 4, to permit lowering movement of said cover. During such lowering movement, the receptacle 61, due to the action of cam slot 67a, is swung on its pivot pins until disposed well interiorly of said cover. Conversely, when the latter is elevated, said cam slot 67a functions to move the receptacle 61 from the position last described to the position illustrated in Figs. 1 and 4. Member 59 preferably comprises a flange or lug 59e, Figs. 3 and 4, which functions to prevent undue displacement of the records from the receptacle 61.

It shall be distinctly understood that the aforesaid receptacle 61, when provided, need not necessarily be pivoted to the member 59, or equivalent. Moreover, mechanism, such as the members 67 and 69, for controlling movement of said receptacle 61 and for holding the cover in elevated position is by no means essential.

The hereindescribed talking machine or phonograph mechanism, in operative condition, is well illustrated in Fig. 1. Such mechanism is intended, ordinarily, for manual operation as well understood. When it is desired to close the cover, the sound box 44 is placed in the compartment 49a of receptacle 49, the record on the turntable 38 is removed therefrom and placed in the receptacle 61, if desired, and pressure is applied to the latter in the direction of the arrow, Fig. 4. Due to the action last noted, the pin 68 is raised in the cam slot 67a and thereafter freely moves therethrough in a counter-clockwise direction, Fig. 4, as the cover is lowered. The latter may be temporarily locked in its lower position by latch mechanism comprising the members 70 and 71. When thus locked, said mechanism may be transported from place to place, as desired, by the handle 72 which is suitably secured to the base section. If desired, metallic supporting knobs 73, or equivalent, may be secured to the respective base and cover sections.

What we claim is:

1. Talking machine or phonograph mechanism comprising a casing, a member extending transversely of said casing and having a depression therein, said member being spaced from the bottom wall of said casing, and horn structure depending from said member, and said depression and horn structure being effective to maintain the rigidity of said member.

2. Talking machine or phonograph mechanism comprising a casing, a fabricated member extending transversely of said casing and spaced from the bottom wall thereof, said member being provided with a depression and an opening, and horn structure secured to said member and discharging sound waves through said opening, said depression and part of said horn structure being effective to maintain said member rigid.

3. Talking machine or phonograph mechanism comprising a casing, a member extending transversely of said casing and spaced from the bottom wall thereof, and horn structure within said casing and beneath said member, a part of said member forming a part of the wall structure of said horn structure.

4. In a talking machine or phonograph, a motor board, a turntable-operating motor at one side thereof and carried thereby, and horn structure permanently secured to said one side of said motor board, a part of said motor board forming a part of the wall structure of said horn structure.

5. In a talking machine or phonograph, a motor board, and horn structure at one side of said motor board, a section of said horn structure adjacent the throat thereof being circumferentially complete and spaced from said motor board, a section of said horn structure adjacent the mouth thereof being secured to said motor board and forming therewith a circumferentially complete horn structure section.

6. In a talking machine or phonograph, a motor board, and a single length horn structure at one side of said motor board, the inlet portion of said horn structure adjacent the throat thereof being complete in itself and spaced from said motor board, the portion of said horn structure continuing to the outlet end thereof being secured directly to said motor board and forming therewith a completely closed air chamber to the outlet end of said horn structure.

7. Talking machine or phonograph mechanism comprising a casing, a motor board extending transversely of said casing and spaced from the bottom wall thereof, a turntable-operating motor within said casing and carried by said motor board, and horn structure within said casing and carried by said motor board, said motor board, motor and horn structure being detachable as a unit from said casing.

8. In a talking machine, the combination of a fabricated sheet metal casing having interior flanges, a fabricated sheet metal motor board resting on and secured to said flanges, and a horn structure and a driving motor secured to and carried by said motor board, said motor board, horn structure and driving motor being removable as a unit from said casing.

9. In a talking machine, the combination of a one-piece sheet metal casing, a sheet metal motor board secured to said casing and constituting a partition extending across the same, a turntable and driving means therefor supported from said motor board, and a horn structure supported from said motor board.

10. In a talking machine, the combination of a one-piece casing formed of shaped sheet metal and provided interiorly thereof with supporting means, and an integral operating unit removable from said casing as a unit, said operating unit comprising a shaped sheet metal partition secured to said supporting means and carrying the operating instrumentalities of said talking machine.

11. In a talking machine, a one-piece casing formed of shaped sheet metal and provided interiorly thereof with supporting means, and an integral operating unit removable from said casing as a unit, said operating unit comprising a shaped sheet metal partition secured to said supporting means, a plurality of shaped sheet metal members secured to the under side of said partition and constituting therewith an amplifying horn, and a driving motor and sound reproducing instrumentalities carried by said partition.

12. In a phonograph, a sheet metal motor board having a stiffened area substantially centrally thereof, said area comprising a stamped depression, a motor attached to said depressed area, and a horn structure comprising a continuous air chamber secured to said motor board, said motor board forming a portion of one wall of said horn structure.

SELDEN T. WILLIAMS.
ALFRED WEILAND.